United States Patent [19]

Bartos

[11] 3,775,667

[45] Nov. 27, 1973

[54] MONOLITHIC INTEGRABLE SERIES STABILIZATION CIRCUIT

[75] Inventor: Franz Bartos, Emmendingen, Germany

[73] Assignee: ITT Industries, Inc., New York, N.Y.

[22] Filed: Mar. 12, 1973

[21] Appl. No.: 340,494

[52] U.S. Cl. .......................... 323/22 T, 323/1, 323/38
[51] Int. Cl. .......................... G05f 1/56
[58] Field of Search .......................... 307/297; 323/1, 4, 323/19, 22 T, 38

[56] References Cited

UNITED STATES PATENTS

| | | | |
|---|---|---|---|
| 3,536,986 | 10/1970 | Perlman | 323/22 T |
| 3,628,127 | 12/1971 | Waldhauer | 323/22 T |
| 3,721,893 | 3/1973 | Davis | 323/22 T |

*Primary Examiner*—A. D. Pellinen
*Attorney*—C. Cornell Remsen, Jr. et al.

[57] ABSTRACT

A series stabilization circuit to generate a regulated voltage with a leakage current in the order of a few microamperes. To provide the low leakage current a constant current source is provided that feeds the common connection point of the base of the auxiliary transistor amplifier and the collector of the reference transistor amplifier.

1 Claim, 1 Drawing Figure

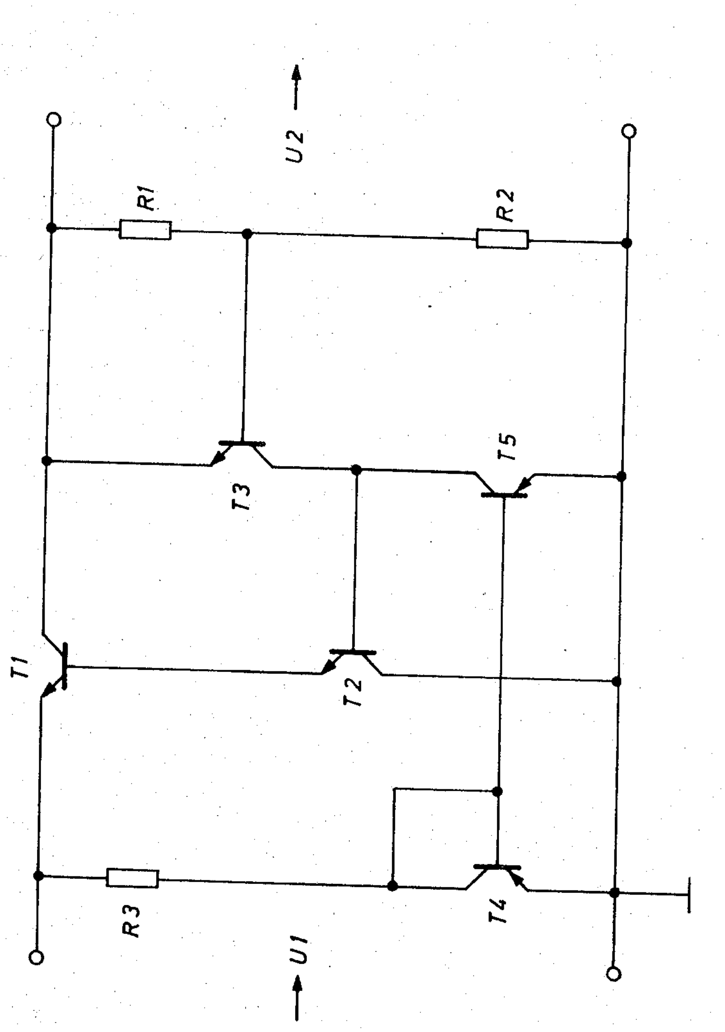
U2
R1
R2
T3
T5
T1
T2
R3
T4
U1

MONOLITHIC INTEGRABLE SERIES STABILIZATION CIRCUIT

BACKGROUND OF THE INVENTION

This invention relates to a series stabilization circuit for generating regulated voltage in the order of 1 volt. In known circuits, the base-emitter threshold voltage of a comparison or reference transistor is used as the reference voltage, because components with a Zener characteristic are not available for voltages in the order of 1 volt.

In one type of known circuit both the main or series transistor and reference transistor are complementary while in another known circuit these two transistors are of the same conductivity type. Each of the two known circuits still comprises an auxiliary transistor which, in the case of the first known circuit, is of the same conductivity type as the reference transistor while, in the case of the second known circuit, this auxiliary transistor is complementary to the main and the reference transistors.

In the first known circuit, this auxiliary transistor merely serves to effect the phase reversal in order to arrive at the intended control behavior. The auxiliary transistor according to the second known circuit, however, is intended to contribute towards enlarging the control sensitivity.

The aforementioned known circuits just like the circuit according to the invention are aimed at keeping constant the supply voltage of single dry cell batteries or accumulators, which gradually decreases during discharge of the batteries in battery-operated equipments, and also at safeguarding an interchangeability of the different commercially available types of single dry cell batteries or accumulators, because the rated voltages thereof are different.

Since these batteries, however, mostly have a small energy content, with the entire current thereof, owing to the duration of the available operating time, being intended to be used exclusively for operating the equipment and its circuit, the series stabilization circuit may only draw an extremely small leakage current, i.e., this leakage current should range between 1 and 10$\mu$A. The known prior art circuits do not satisfy this requirement.

SUMMARY OF THE INVENTION

It is the object of the invention to provide a monolithic integrable series stabilization circuit in which will only consume a leakage current ranging between 1 and 10$\mu$A.

According to a broad aspect of the invention there is provided a monolithic integrable series stabilization circuit for generating a stabilized constant amplitude output voltage in the order of 1 volt from a variable amplitude input voltage comprising: a main transistor having an emitter, base and collector, said emitter coupled to the input voltage and said collector coupled to the output voltage, a voltage divider having a tapping point, said voltage divider coupled between ground and the output voltage, a reference transistor of the same conductivity type as the main transistor having an emitter, base and collector, the base-emitter voltage thereof serving as a reference voltage, said base of said reference transistor coupled to said tapping point and said emitter of said reference transistor coupled to the stabilized output voltage, an auxiliary transistor of the same conductivity type as the main transistor having an emitter coupled to the base of said main transistor, a base coupled to the collector of said reference transistor and a collector coupled to ground, a constant current transistor having a conductivity complementary to said main, reference and auxiliary transistors having an emitter, base and collector, said collector of said constant current transistor coupled to and supplying a constant current to the base of said auxiliary transistor and the collector of said reference transistor, and said emitter of said constant current transistor coupled to ground, a constant voltage transistor of the same conductivity type as said constant current transistor having en emitter, base and collector, said emitter of said constant voltage transistor coupled to ground, and said base of said constant voltage transistor coupled to the base of said constant current transistor and to the collector of said constant voltage transistor and a dropping resistor coupled between said input voltage and the collector of said constant voltage transistor.

BRIEF DESCRIPTION OF THE DRAWING

The above and other objects of the present invention will be better understood from the following detailed description taken in conjunction with the accompanying schematic diagram of the inventive stabilization circuit.

DESCRIPTION OF THE PREFERRED EMBODIMENTS

The shown series stabilization circuit consists of the main or series transistor T1, with the emitter thereof being connected to the input voltage U1, and with the collector thereof being connected to the stabilized output voltage U2.

Between the stabilized output voltage U2 and the zero point of the circuit there is arranged the voltage divider consisting of the voltage-dividing resistors R1 and R2. To the tapping point of this voltage divider constituted by the common connecting point of the two resistors, there is connected the base of the reference transistor T3; the emitter of the reference transistor T3 is likewise connected to the stabilized output voltage U2. In the inventive circuit the base-emitter threshold voltage of the reference transistor is used as a reference voltage for the stabilization circuit.

The collector of the reference transistor T3 is connected to the base of the auxiliary transistor T2, with the collector thereof being connected to the zero point of the circuit, and with the emitter thereof being connected to the base of the main transistor T1.

The invention is based on the recognition that a low leakage current ranging between 1 and 10$\mu$A is obtained when the common connecting point of the base of the auxiliary (reference amplifier) transistor T2 and the collector of the reference transistor T3 (acting as the reference potential source) is being fed with a constant current. The stabilizing effect of the inventive circuit thus results from the fact that the reference transistor T3 requires more constant current when the output voltage U2 increases, so that less current is flowing in the auxiliary transistor T2, this leading to an increase of the output resistance of the main transistor, thus compensating again for the increase of the output voltage U2.

Accordingly, the common connecting point of the base of the auxiliary transistor T2 and the collector of the reference transistor T3 is fed in the inventive manner from the collector of the further transistor T5 which is being operated as a constant current source and which is complementary to the main, the auxiliary and the reference transistors. The emitter of this transistor T5 is connected to the zero point of the circuit while its base is connected to a constant voltage. For this purpose there is provided the transistor T4 which is connected as a diode, and which is likewise complementary to the main, the auxiliary and the reference transistors, in other words, the two transistors T4 and T5 are of the same conductivity type.

The emitter of constant voltage transistor T4 which is connected as a diode, is connected to the zero point of the circuit while both the base and the collector thereof are connected to one another and, across the dropping resistor R3, to the non-stabilized input voltage U1.

In the case of a circuit monolithically integrated in accordance with the known bipolar technique, for stabilizing the output voltage to 1.1 V at an initial input voltage of 1.5 V (Manganese dioxide single dry cell battery) for a maximum current drain of 0.5 mA the three resistors existing in the circuit were realized by means of diffused semiconductor zones and had the following resistance values:

R1 and R2 820 kilohms each
R3 1 megohm.

In this circuit, across the dropping resistor R3 and via the transistor T4, there flows a leakage current of about 1 $\mu$A. A current of the same value, hence of 1 $\mu$A, flows over the collector-emitter path of the constant current transistor T5, with this current then dividing itself, according to the invention, between the base-emitter path of the auxiliary transistor T2 and the collector-emitter path of the reference transistor T3. A leakage current of somewhat less than 1 $\mu$A flows across the voltage divider consisting of the resistors R1 and R2, with the base current of the main transistor which is dependent upon the current load of the series stabilization circuit, flowing over the collector-emitter path of the auxiliary transistor T2.

Accordingly, in the given example of embodiment, under no-load conditions, there will flow a leakage current of not quite 3 $\mu$A which, under current-load conditions, increases by an amount which is equal to the current load divided by the current gain factor when the main transistor T1 is arranged in a grounded-emitter connection.

It is to be understood that the foregoing description of specific examples of this invention is made by way of example only and is not to be considered as a limitation on its scope.

I claim:

1. A monolithic integrable series stabilization circuit for generating a stabilized constant amplitude output voltage in the order of 1 volt from a variable amplitude input voltage comprising:

a main transistor having an emitter, base and collector, said emitter coupled to the input voltage and said collector coupled to the output voltage;

a voltage divider having a tapping point, said voltage divider coupled between ground and the output voltage;

a reference transistor of the same conductivity type as the main transistor having an emitter, base and collector, the base-emiiter voltage thereof serving as a reference voltage, said base of said reference transistor coupled to said tapping point and said emitter of said reference transistor coupled to the stabilized output voltage;

an auxiliary transistor of the same conductivity type as the main transistor having an emitter coupled to the base of said main transistor, a base coupled to the collector of said reference transistor and a collector coupled to ground;

a constant current transistor having a conductivity complementary to said main, reference and auxiliary transistors having an emitter, base and collector, said collector of said constant current transistor coupled to and supplying a constant current to the base of said auxiliary transistor and the collector of said reference transistor, and said emitter of said constant current transistor coupled to ground;

a constant voltage transistor of the same conductivity type as said constant current transistor having an emitter, base and collector, said emitter of said constant voltage transistor coupled to ground, and said base of said constant voltage transistor coupled to the base of said constant current transistor and to the collector of said constant voltage transistor; and a dropping resistor coupled between said input voltage and the collector of said constant voltage transistor.

* * * * *

UNITED STATES PATENT OFFICE

CERTIFICATE OF CORRECTION

Patent No. 3,775,667 Dated November 27, 1973

Inventor(s) Franz Bartos

It is certified that error appears in the above-identified patent and that said Letters Patent are hereby corrected as shown below:

30 Add --Foreign Application Priority Date

April 15, 1972 Germany - - - - P 22 18 308.0--.

Signed and sealed this 11th day of June 1974.

(SEAL)
Attest:

EDWARD M.FLETCHER,JR.
Attesting Officer

C. MARSHALL DANN
Commissioner of Patents